United States Patent
Nate et al.

(10) Patent No.: US 7,311,510 B2
(45) Date of Patent: Dec. 25, 2007

(54) HONEYCOMB FORMING DIE

(75) Inventors: Masayuki Nate, Nagoya (JP); Takahisa Kaneko, Nagoya (JP); Masayuki Hironaga, Nagoya (JP); Yuji Deguchi, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 29 days.

(21) Appl. No.: 10/507,413

(22) PCT Filed: Jan. 31, 2003

(86) PCT No.: PCT/JP03/01031

§ 371 (c)(1),
(2), (4) Date: Sep. 13, 2004

(87) PCT Pub. No.: WO03/082539

PCT Pub. Date: Oct. 9, 2003

(65) Prior Publication Data

US 2005/0147707 A1    Jul. 7, 2005

(30) Foreign Application Priority Data

Mar. 28, 2002  (JP) .............................. 2002-091034

(51) Int. Cl.
   *B29C 47/12*  (2006.01)
(52) U.S. Cl. .................. 425/380; 425/467; 264/117.12
(58) Field of Classification Search ............... 425/380, 425/382 R, 460, 461–467, 198, 288; 428/117, 428/118, 131, 134; 264/177.12
See application file for complete search history.

(56) References Cited

U.S. PATENT DOCUMENTS

| | | | | |
|---|---|---|---|---|
| 4,290,743 A | * | 9/1981 | Suzuki ....................... | 425/461 |
| 4,373,895 A | * | 2/1983 | Yamamoto et al. ......... | 425/461 |
| 4,486,934 A | * | 12/1984 | Reed ......................... | 76/107.1 |
| 4,557,773 A | * | 12/1985 | Bonzo ........................ | 156/64 |
| 4,740,408 A | * | 4/1988 | Mochida et al. ............ | 428/116 |
| 4,802,840 A | * | 2/1989 | Fukuda et al. .............. | 425/464 |
| 4,810,554 A | * | 3/1989 | Hattori et al. .............. | 428/116 |
| 5,597,591 A | * | 1/1997 | Hagenah ..................... | 425/346 |
| 6,159,431 A | * | 12/2000 | Inoue et al. ................ | 422/180 |
| 6,193,497 B1 | * | 2/2001 | Suzuki ....................... | 425/380 |
| 6,669,751 B1 | * | 12/2003 | Ohno et al. .................. | 55/523 |

FOREIGN PATENT DOCUMENTS

| | | |
|---|---|---|
| JP | A 8-90534 | 4/1996 |
| JP | A 2000-71225 | 3/2000 |
| JP | A 2000-326318 | 11/2000 |
| JP | 2001300922 A * | 10/2001 |

* cited by examiner

*Primary Examiner*—Yogendra N. Gupta
*Assistant Examiner*—Dimple N. Bodawala
(74) *Attorney, Agent, or Firm*—Oliff & Berridge, PLC

(57) ABSTRACT

Disclosed is a die (10) for forming a honeycomb body having a structure provided with groovy slits (2) on a front face thereof, the slits being formed by cell blocks (3) and back holes (4) on a back surface thereof, each hole being communicatively connected with the slit. The number N of the cell blocks per one side of the die is even number. According to the die for forming the honeycomb body, strain generated on an extruded face of the honeycomb body after extrusion and bending of the honeycomb body can be reduced as well as the die can maintain a stable frictional force of extrusion and is excellent in extrudability and wear resistance.

4 Claims, 5 Drawing Sheets

COMPARATIVE ART

COMPARATIVE ART

HONEYCOMB FORMING DIE

TECHNICAL FIELD

The present invention relates to a die for forming honeycomb body.

BACKGROUND ART

A honeycomb structure has been used in a filter for trapping particulate matter in exhaust gas from an internal combustion engine, boiler, and the like, particularly diesel particulate matter.

Heretofore, as an extrusion die for a ceramic honeycomb body, for example, there has been known the extrusion die (10) for a honeycomb body shown in FIGS. 4 and 5, which is provided with groovy slits (2) on the front face of a base metal made of stainless steel and iron, the groovy slits being formed by cell blocks, and provided with back holes (4), on a back face thereof, each communicatively connected with the slit (2).

At the time, when a honeycomb segment is extruded using, for example, a die having a square honeycomb structure (in particular, when a honeycomb segment whose outer wall thickness is not large is extruded), if the number of cell blocks per one side is odd number, design of cell blocks 3 and back holes 4 is not appropriate particularly at corner portions 7. Accordingly, when the honeycomb segment is extruded by a die jig shown in FIG. 6, a kneaded clay extrusion speeds is made uneven at slits, from which strain is generated on an extruded face (pattern) of an extruded body and the extruded body (the formed body) is bent.

Further, when the cell blocks 3 are formed at right angle at the corner portions 7 as shown in FIG. 2, flow of kneaded clay is deteriorated. Accordingly, concavo-convex portions may be formed on an extruded face of a resultant extruded body (honeycomb segment), and fine splits 40 may be generated on an outer wall as shown in FIG. 7(b).

The present invention is made in view of the above described problems heretofore, and aims to provide an extrusion die for a honeycomb body, which is possible to reduce strain generated on an extruded face of an extruded body after extrusion, possible to maintain a stable frictional force of extrusion, excellent in extrudability, and excellent in wear resistance.

DISCLOSURE OF THE INVENTION

According to the present invention, there is provided a die for forming a honeycomb body, the die comprising a structure provided with: groovy slits formed on a front face thereof, the slits being formed by cell blocks; and provided with back holes on a back face thereof, each hole being communicatively connected with the slit, characterized in that the number of the cell blocks per one side of the die is even number.

At the time, it is preferable in the present invention that curved portions be formed at four corners on an peripheral portion of the die and that a radius of curvature of the curved portions be 0.5 to 1.5 mm.

Further, in the present invention, it is preferable that a die be made of cemented carbide having high wear resistance and that the cemented carbide be formed by compacting, followed by sintering at high temperature, metal carbide powder of transition metal element series with an iron group metal binder having toughness.

At the time, it is preferable that the back holes are disposed at every one positions of the cell blocks and that a thickness of the die is 15 to 30 mm.

BRIEF DESCRIPTION OF THE DRAWINGS

FIGS. 7(a) and 7(b) show a shape of an extruded honeycomb structure, in which FIG. 7(a) shows a case in which the die of FIG. 1 is used, and FIG. 7(b) shows a case in which the die of FIG. 2 is used.

EXPLANATION OF SYMBOLS

1 . . . die for forming a honeycomb body, 2 . . . slit, 3 . . . cell block, 4 . . . back hole, 6 . . . diaphragm portion, 7 . . . corner portion, 8 . . . curved portion, 10 . . . die for extruding a honeycomb body, 12 . . . holding plate, 14 . . . back holding plate, 15 . . . holding jig, 16 . . . forming ring holder, 18 . . . forming ring, 20 . . . die holder, 22 . . . noodle die, 24 . . . screen, 30 . . . outer wall of honeycomb structure, 40 . . . fine

BEST MODE FOR CARRYING OUT THE INVENTION

Detailed description will be made below on embodiments of the present invention on the basis of the drawings.

Figure 1:
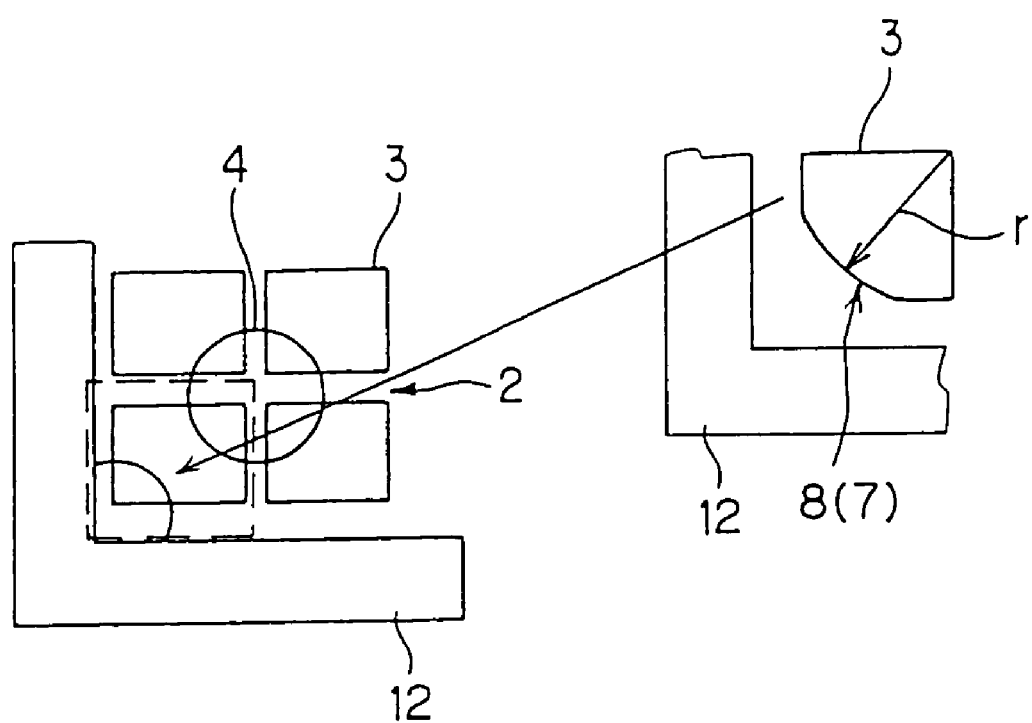
FIG. 1 is a front perspective view showing an example of a corner portion of an extruded face formed by a die and a holding plate of the present invention and shows an example of a layout of cell blocks and back holes.

FIG. 1 is a front perspective view showing an example of a corner portion of an extruded face formed by a die and a holding plate of the present invention and shows an example of a layout of cell blocks and back holes.

Figure 4:
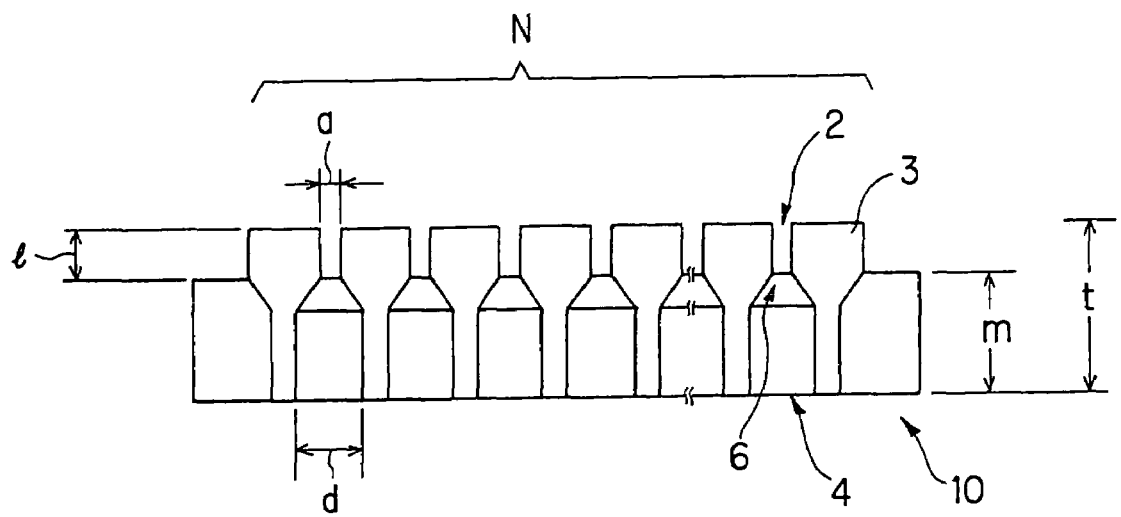
FIG. 4 is a schematic sectional view showing an example of a die for forming a honeycomb body.
Figure 5:
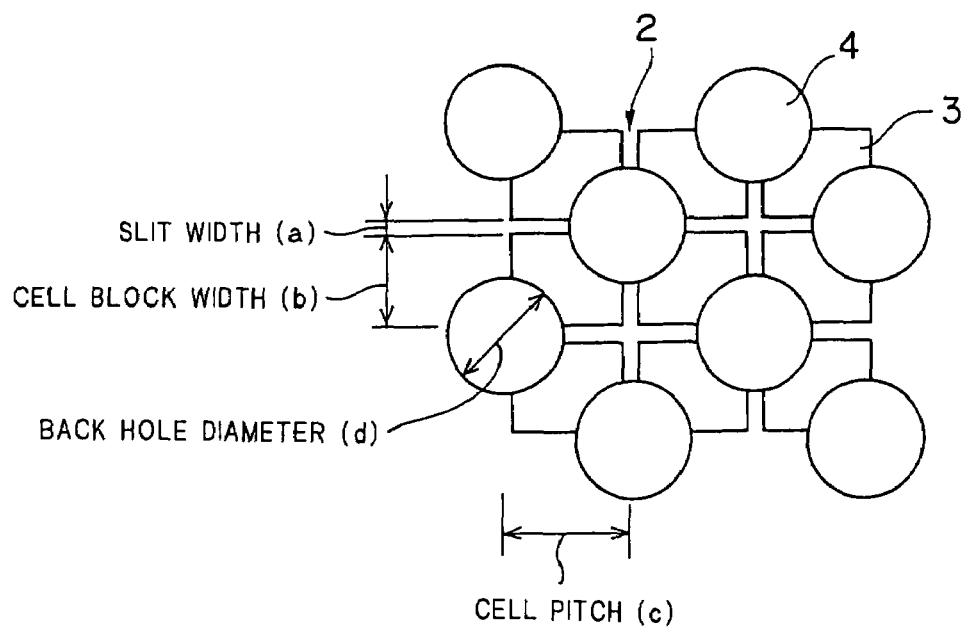
FIG. 5 is an explanatory view showing a relation between cell blocks and back holes.

At the time, a main feature of the die of the present invention (which is designed to provide one back hole 4 every four cell blocks) resides in that the number N of cell blocks per one side of the die is set to even number (refer to FIG. 4).

With the above arrangement, when a honeycomb segment is executed using the die having a square honeycomb structure (in particular, when a honeycomb segment whose outer wall thickness is not large is extruded), the cell blocks 3 and the back holes 4 at the corner portions 7 can be uniformly designed at four upper, lower, right, and left corners as shown in FIG. 1. Accordingly, an extruding speed of kneaded clay in slits 2 formed by a holding plate 12 and the corner portions 7 and an extruding speed thereof in slits 2 formed in the die can be made uniform, which can prevent distortion generated on an extruded face (pattern) of an extruded body and bending of the formed body.

Further, as shown in FIG. 1, it is preferable that the die of the present invention have curved portions 8 at four corners of a peripheral portion of the die and that the curved portions 8 have a radius of curvature r of 0.5 to 1.5 mm.

Figure 7A:
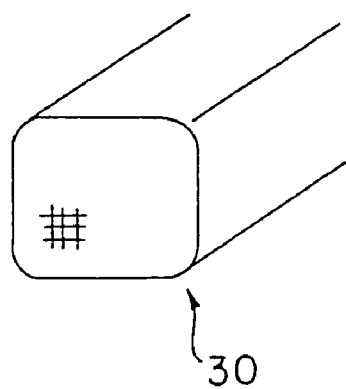
Figure 7B:
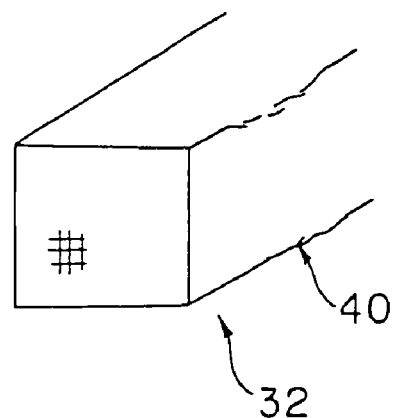

With the above arrangement, when the honeycomb segment is executed using the die having the square honeycomb structure (in particular, when the honeycomb segment whose outer wall thickness is not large is extruded), a formed body having an excellent extruded face and an excellently attached outer wall of the honeycomb structure 30 can be obtained as shown in FIG. 7(a) without uneven portions on the extruded face and without generation of fine splits 40 on the outer wall 32 (refer to FIG. 7(b)).

Further, the die of the present invention is preferably made of cemented carbide having high wear resistance.

With the above arrangement, even if a raw material containing a material having very high hardness such as SiC and the like is extruded, the wear resistance (life) of the the die can be enhanced as well as a defect in shape of the die due to wear thereof can be overcome.

Although there is not particular restriction as to the cemented carbide, it is preferably formed by compacting, followed by sintering at high temperature, metal carbide powder of transition metal element series, for example, WC, TiC, TaC, etc. with an iron group metal binder having high toughness such as Co, Ni, etc.

Further, the die of the present invention preferably has a thickness (t) of 15 to 30 mm (more preferably 15 to 24 mm) (refer to FIG. 4).

The thickness of the die is determined in consideration of strength of the die and flow of kneaded clay when a honeycomb body is extruded.

At the time, when the die is excessively thick, it is improper because not only accuracy of the back holes machined by a drill and the like is deteriorated but also strain due to contraction in final sintering is increased. In contrast, when the die is excessively thin, it is broken when a honeycomb structure is extruded by the die due to its insufficient strength.

Note that when the honeycomb structure is formed, kneaded clay can stably flow in the die by making a back hole portion as short as possible because a flow resistance in length is reduced thereby.

Further, in the present invention, when cemented carbide is used as a material of the die, it is preferable to dispose a back hole at every other positions of the cell blocks because the cell blocks are liable to be broken when a connecting area of the back holes and the cell blocks is excessively small.

The present invention will further be described hereinafter in detail based on examples, but the present invention is not limited to these examples.

(Method of Production of Cemented Carbide Die: Used in Examples 1 to 3, Comparative Examples 1 to 4)

After WC—Co (composite body of tungsten carbide and cobalt) powder as cemented carbide was formed into a square plate of 100 mm on a side and 40 mm in thickness (100×100×40 t) by press work and the like, it was calcined at 500 to 700° C. Thereafter, back holes having a predetermined diameter and a predetermined depth were drilled with a predetermined pitch from one end face of the square plate, and then the square plate was subjected to final sintering at 1000 to 1300° C., thereby it was contracted up to a square plate of 24 mm in thickness and 70 mm on a side (70×70×24 t). Thereafter, a predetermined dimension of the square plate was accurately obtained by polishing the entire surface thereof.

Next, a cemented carbide die whose slit width and die shape were formed square was obtained by forming slits on the other face of the thus obtained square plate in a grid pattern at every other positions of the back holes, which were previously formed on one face of the square plate, by wire cut electric-discharge machining, or creep feed grinding or plunge cut grinding with diamond abrasive grain.

(Extrusion of the Honeycomb Body)

Figure 6:
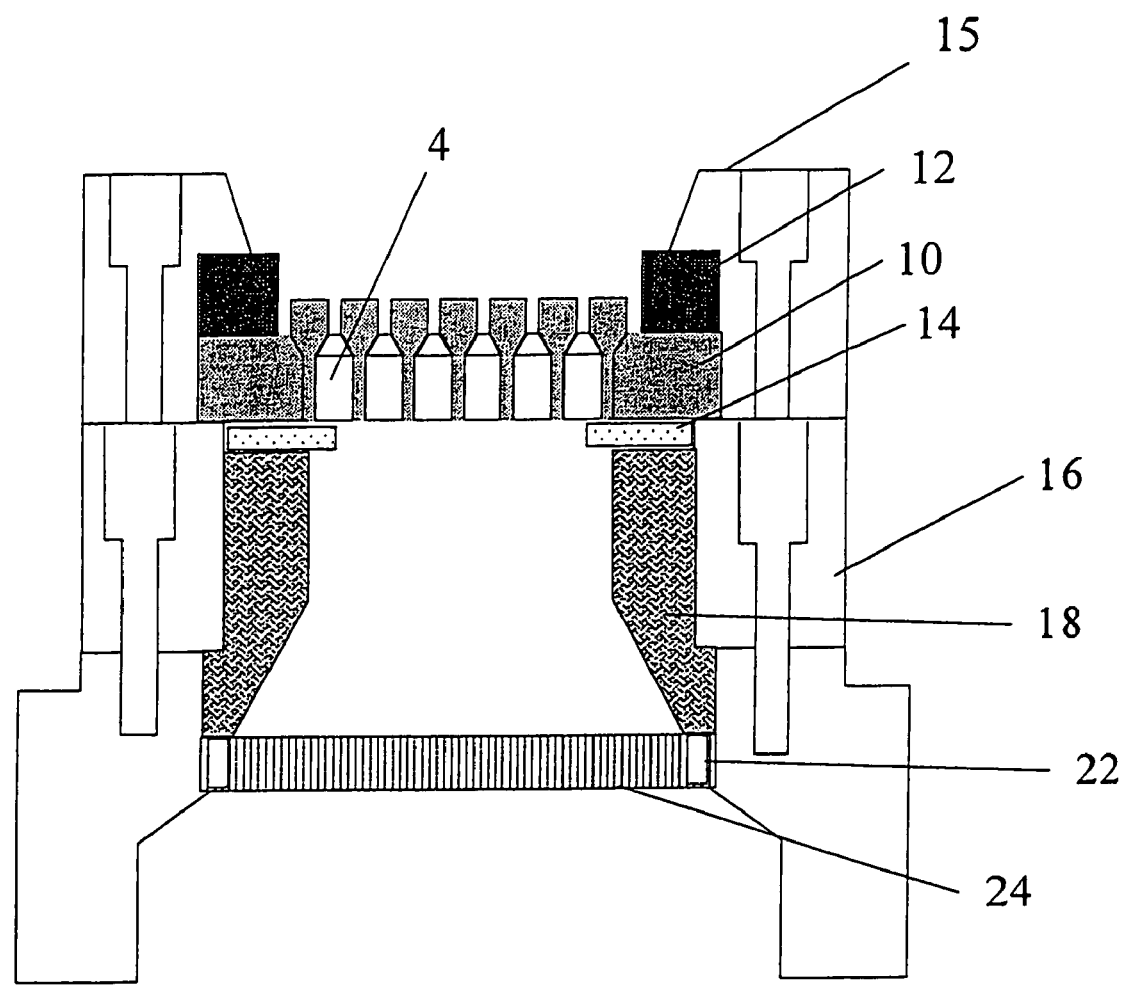
FIG. 6 is a configurational view showing an example of a die jig for forming a honeycomb body.

The die for forming a honeycomb body was set to a die jig shown in FIG. 6, and a honeycomb structure was extruded using kneaded clay composed of raw material of argillaceous Si—SiC.

Note that the kneaded clay was obtained by kneading a raw material made of metal silicon (Me-Si) and SiC which were prepared at a ratio of 25:75 and to which water, an organic binder, and a hole forming material were added.

EXAMPLE 1, COMPARATIVE EXAMPLES 1 AND 2

Honeycomb structures were extruded, respectively using cemented carbide dies shown in Table 1 (example 1, comparative examples 1 to 2). The results are shown in Table 1.

TABLE 1

| | Type of die | | | | |
|---|---|---|---|---|---|
| | Number of cell blocks per one side | Back hole area ratio of respective corner portions* | Disposition of back holes | Shape of extruded face of honeycomb structure | Evaluation |
| Example 1 | Even number (Refer to FIG. 1) | Same in respective corner portions | Every one positions | ○ | ○ |
| Comparative example 1 | Odd number (Refer to FIG. 2) | Area difference of about 15% in diagonal line direction | Every one positions | X (Concavo-convex portions occurring according to difference of area) | X (Deformation due to difference of area) |
| Comparative example 2 | Even number (Refer to FIG. 3) | Same in respective corner portions | All holes | ○ | X (Breakage of die due to insufficient strength) |

*1 Corner portions: Dotted-line portions in FIGS. 1 to 3

From the results of Table 1, when the number of the cell blocks per one side of the die was even number and the back holes were disposed at every one positions of the cell blocks in the back hole structure of the die as shown in FIG. 1 (example 1), back hole area ratios could be set to the same ratio in respective corner portions. Accordingly, strain, which was generated on an extruded face (pattern) of a honeycomb structure after extrusion, and bending of an extruded body could be prevented.

Figure 2:
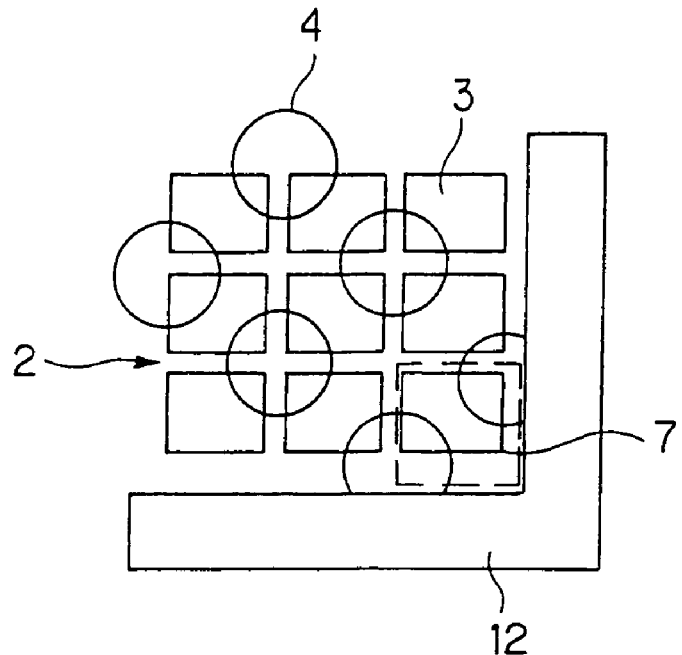
FIG. 2 is a front perspective view showing an example of a layout of cell blocks and back holes at a corner portion of an extruded face formed by a conventional die and a conventional holding plate.

In contrast, when the number of the cell blocks per one side of the die was odd number and the back holes were disposed at every one positions of the cell blocks in the back hole structure of the die as shown in FIG. 2 (comparative example 1), back hole area ratios had an area difference of about 15% in a diagonal line direction at respective corner portions. Accordingly, strain, which was generated on an extruded face (pattern) of a honeycomb structure after extrusion, and bending of an extruded body were generated.

Figure 3:
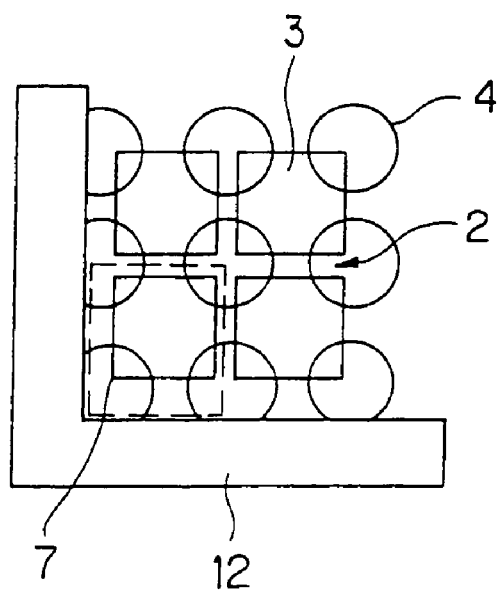
FIG. 3 is a front perspective view showing another example of the layout of the cell blocks and the back holes at the corner portion of the extruded face formed by the conventional die and the conventional holding plate.

Further, when the number of the cell blocks per one side of the die was even number and all the holes were made to back holes with respect to the cell blocks in the back hole structure of the die as shown in FIG. 3 (comparative example 2), back hole area ratios could be set to the same ratio at respective corner portions. Accordingly, strain, which was generated on an extruded face (pattern) of a honeycomb structure after extrusion, and bending of a formed body could be prevented. However, the die was broken because its strength was insufficient.

EXAMPLES 2 AND 3, COMPARATIVE EXAMPLES 3 AND 4

Honeycomb structures were extruded, respectively using cemented carbide dies shown in FIG. 1 having curved portions 8 shown in Table 2, the curved portions 8 being formed to corner portions 7 of cell blocks 3 on an outermost peripheral portion of the die. The results are shown in Table 2.

TABLE 2

| | Radius of curvature r of curved portion (mm) [refer to FIG. 1] | Presence or absence of crack of extruded honeycomb structure |
|---|---|---|
| Example 2 | 0.5 | Absent |
| Example 3 | 1.5 | Absent |
| Comparative example 3 | 0.0 | Present |
| Comparative example 4 | 2.0 | Breakage of cell blocks |

From the results of Table 2, the present invention could prevent occurrence of cracks at the corner portions 7 of a honeycomb structure after extrusion by setting a radius of curvature r of a curved portion 8 to 0.5 to 1.5 mm with respect to a length of a side of a cell block (examples 2 to 3).

In contrast, in a comparative example 3, cracks were generated at corner portions 7 of a honeycomb structure after extrusion. This is because that the comparative example 3 had no curved portions 8, and thus a small amount of kneaded clay flew from back holes of the corner portions 7.

Further, in a comparative example 4, when a honeycomb structure was extruded, cell blocks were broken. This is because that a radius of curvature r of curved portions 8 exceeded 1.5 mm, and thus a die had an insufficient strength.

EXAMPLES 4 AND 5, COMPARATIVE EXAMPLES 5 AND 6

After WC—Co (composite body of tungsten carbide and cobalt) powder as cemented carbide was formed into a square plate of 100 mm on a side and 40 mm in thickness (100×100×40 t), it was tentatively sintered at 500 to 700° C. Thereafter, back holes having a predetermined diameter and a predetermined depth were drilled with a predetermined pitch from one end face of the square plate, and then the square plate was subjected to final sintering at 1000 to 1300° C., thereby it was contracted up to a square plate of 24 mm in thickness and 70 mm on a side (70×70×24 t). Thereafter, a predetermined dimension of the square plate was accurately obtained by polishing the entire surface thereof.

Next, a cemented carbide die whose slit width and die shape were formed in a square shape was obtained by forming slits on the other end surface of the thus obtained square plate in a grid pattern at every other positions of the back holes, which were previously formed on one face of the square plate, by wire cut electric discharge machining, or creep feed grinding or plunge cut grinding with diamond abrasive grain.

Next, honeycomb structures were extruded, respectively using the thus obtained dies. The results are shown in Table 3.

TABLE 3

| | Thickness of die (mm) | Shape of product | Amount of bending (mm)* | Crack of die | Evaluation |
|---|---|---|---|---|---|
| Example 4 | 15 | ◯ | 0.5 | Absent | ◯ |
| Example 5 | 30 | ◯ | 0.6 | Absent | ◯ |
| Comparative example 5 | 10 | ◯ | 0.3 | Breakage of die | X |
| Comparative example 6 | 40 | X | 1.2 | Absent | X |

*Amount of bending: a stroke of a gauge, which was shown by a dial gauge located at the center of a segment was measured with respect to the two points at the opposite ends of the segment.

From the results of Table 3, it was confirmed that a thickness (t) of the die (refer to FIG. 4) was preferably set to 15 to 30 mm as a result that strength of the die, and a flow rate of kneaded clay in extrusion of an extruded body were optimized. (Comparative example 4 to 5).

At the time, a die whose thickness was excessively large as in the comparative example 6 was improper because not only an accuracy of the back holes machined by a drill and the like was deteriorated but also strain due to contraction in final sintering was increased.

In contrast, when a thickness of the die was excessively small as in the comparative example 5, the die was broken due to insufficient strength of the die when a honeycomb structure was extruded.

INDUSTRIAL APPLICABILITY

The die for forming a honeycomb body of the present invention is possible to reduce strain generated on an extruded face of the honeycomb body after extrusion, possible to maintain a stable frictional force of extrusion, excellent in extrudability, and excellent in wear resistance.

The invention claimed is:

1. A die for forming a honeycomb body, the die comprising a structure provided with:
    groovy slits formed on a front face thereof, the slits being formed by cell blocks; and
    back holes on a back face thereof, each hole being communicatively connected with the slit,
    wherein the number of cell blocks per one side of the die is an even number, and the back holes are disposed at every other position of the cell blocks, and
    wherein curved portions are formed at four corners of a peripheral portion of the die and a radius of curvature of the curved portions is 0.5 to 1.5 mm.

2. A die for forming a honeycomb body according to claim 1, wherein the die is made of cemented carbide having high abrasion resistance.

3. A die for forming a honeycomb body according to claim 2, wherein the cemented carbide is formed by compacting, followed by sintering at high temperature, a metal carbide powder of transition metal element series with an iron group metal binder having tenacity.

4. A die for forming a honeycomb body according to claim 1, wherein a thickness of the die is 15 to 30 mm.

* * * * *